Feb. 9, 1954            C. SHAIKUN            2,668,477
MAIN AND AUXILIARY MIRROR ASSEMBLY
Filed Oct. 11, 1951
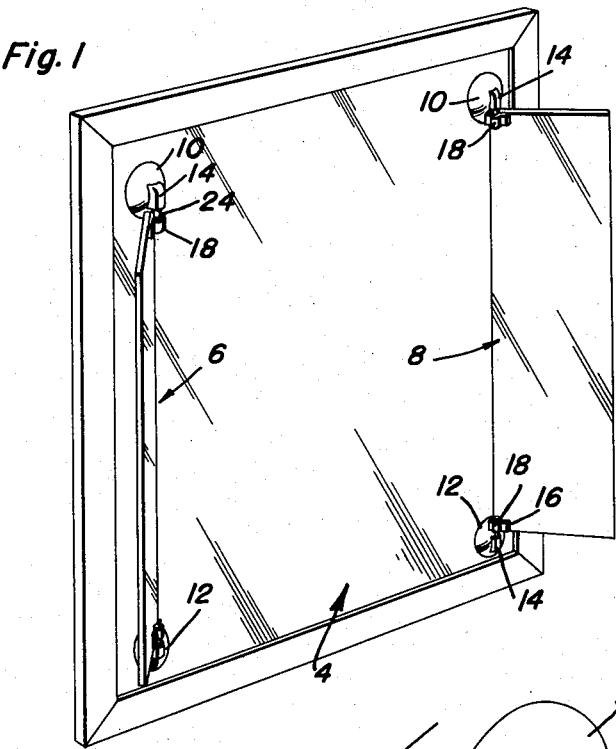
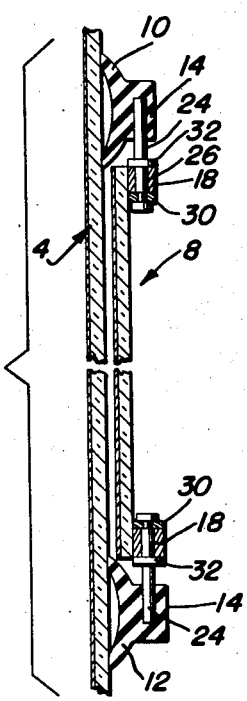
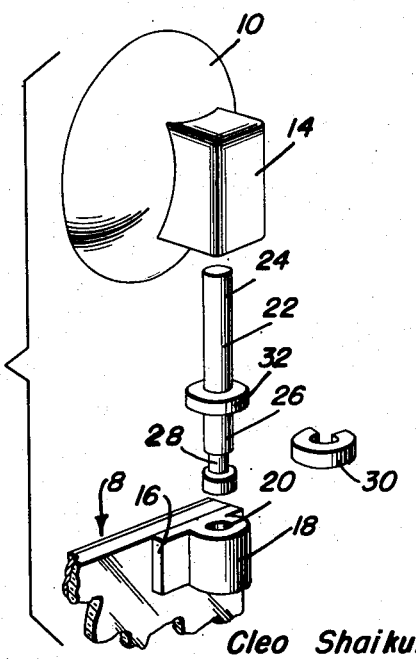
Cleo Shaikun
INVENTOR.
BY
Attorneys Patented Feb. 9, 1954

2,668,477

UNITED STATES PATENT OFFICE 2,668,477

MAIN AND AUXILIARY MIRROR ASSEMBLY

Cleo Shaikun, Louisville, Ky.

Application October 11, 1951, Serial No. 250,825

2 Claims. (Cl. 88—91)

The present invention relates to certain new and useful improvements in mirror constructions and has particular reference to a mirror assembly characterized by a main relatively stationary mirror and one or more auxiliary mirrors which are detachably and interchangeably associable with the main mirror, whereby an arrangement of either two or three mirrors may be had.

The primary object is, of course, to provide a pair of duplicate auxiliary mirrors which may be conveniently employed as complemental wings or vertical side panels when used on and in association with a supporting main mirror, whereby to provide three relatively adjustable mirror surfaces which, when properly adjusted in relation to each other, make it possible for the observer to pick up reflections from varying angles and to permit observations to be had which are not obtainable with a single flat mirror.

Although the invention is useful in many and varied lines of endeavor, it is chiefly adapted for use in the home where a flat wall mirror in the bedroom or elsewhere may be provided with the added mirror panels or where the latter may be mounted for example on the usual hinged mirror provided in a mirrored-type medicine cabinet in the bathroom or elsewhere.

In carrying out a preferred embodiment of the invention, the auxiliary mirrors are provided in duplicate pairs. They are, compared to the main mirror, relatively small in order that they may be mounted within the perimeter limits of the main mirror. These auxiliary mirrors are provided with appropriate hardware and this is preferably such that the desired hinging and mounting accomplishments may be made through the medium of simple rubber suction cups which latter may be temporarily and therefore detachably mounted on the main mirror at prescribed cooperating areas.

A somewhat more general object is to improve upon and reduce the number of parts entering into the combination thereby not only increasing the efficiency of the structure as a whole, but rendering the same less costly to manufacture and to otherwise simplify factors of assembling and sale.

A still further object of a similar general scope is to structurally and otherwise improve upon prior art mirror assemblies and constructions and, in doing so, to provide an amply suitable assembly in which manufacturers and users will find their respective requirements and needs satisfactorily met and effectually contained.

Other objects and advantages will become more readily apparent from the following description and the accompanying sheet of illustrative drawings.

In the accompanying sheet of drawings wherein like numerals are employed to designate like parts throughout the view:

Figure 1 is a perspective view showing the triple mirror assembly constructed in accordance with the present invention;

Figure 2 is a fragmentary view with parts in section and elevation showing the main mirror and one of the auxiliary mirrors and the means whereby the two are adjoined for cooperative relationship, and Figure 3 is a fragmentary perspective view on an enlarged scale showing certain of the details with greater particularity.

Referring now to the drawings and first to Figure 1, the main mirror is denoted by the numeral 4. As stated this may be any suitable relatively stationary mirror. If one already has a mirror in the home then it is only necessary to purchase extra or auxiliary complements, the ones which are denoted by the numerals 6 and 8 respectively. Alternatively it may be that the commercial angle may best be realized through the sale of a triple mirror arrangement or assembly wherein the purchaser buys a main mirror and readily applicable and removable wings or auxiliary mirrors 6 and 8 to work together in requisite nicety, as is obvious. It may also be pointed out that the mirror 4 may, of course, be one which is on a dressing table, one on a bedroom or other room wall or it may be a long panel mirror on a so-called mirror door or the mirror in the bathroom.

Since the means whereby the auxiliary mirror is mounted on the main mirror is the same in each instance the description for the means of a single auxiliary mirror will be employed here. To this end, each auxiliary mirror is supported by way of two attaching devices. The devices are preferably in the form of simple upper and lower rubber or equivalent suction cups 10 and 12. Each suction cup, as best shown in Figure 3, has an enlarged lug 14 thereon which is provided with a socket. The hardware or hinge means which is associable with each suction cup is shown in Figure 3. Here each such means comprises a bracket 16 appropriately secured to the mirror and provided with a bearing knuckle 18 having a pintle hole 20 therethrough. The hinge pintle is denoted by the numeral 22 and the upper end portion 24 is adapted to fit snugly up into the socket provided therefor in the suction cup 14. The lower end portion 26 is adapted to slide through the hole 20 where it is provided on its lower end with a reduced portion 28 providing a neck for accommodation of an assembling and locking collar 30. The latter is a simple horseshoe-shaped collar. The numeral 32 designates a stop flange or shoulder provided on the pintle and which has rotary end thrust association with the bearing knuckle 18. With the hinge devices bracketed to the end portions of the auxiliary mirrors in the manner shown and with the respective pairs of suction cups attached, as shown, it is obvious that each auxiliary mirror may be readily applied and removed. In some instances the user may simply employ a single auxiliary mirror but in most instances they will be used in pairs thus providing an arrangement similar to the tripple panel arrangement of permanent mirrors often used on present-day boudoir and dressing tables.

With detachable and interchangeable mirrors at hand the owner will have at her disposal a practical and economical assembly which appears to be a novel contribution to this line of endeavor.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In combination, a stationary mirror having a flat reflecting face, said mirror having the additional function of a supporting base, a second mirror complemental to said first mirror, said second mirror being of an area appreciably less than the area of said first mirror, and means hingedly and detachably mounting one marginal edge portion of said second mirror directly on the reflecting face of the first mirror within the marginal limits of the latter mirror, said means embodying upper and lower vacuum cups detachably mounted on said reflecting face, within the stated marginal limits of said reflecting face, and pintles mounted on the respective upper and lower ends of said second mirror and having end portions assembled in the respective vacuum cups, said pintles being disposed in close spaced parallelism in respect to said reflecting surface and the stated one marginal edge portion of said second mirror being consequently disposed in close spaced parallelism to said reflecting surface.

2. In combination, a relatively stationary main mirror, a pair of duplicate auxiliary mirrors, the reflection surface of said main mirror being of an area appreciably greater than the combined area of both reflecting surfaces of said auxiliary mirrors, and means hingedly and detachably securing corresponding corner portions of the respective auxiliary mirrors to the flat reflecting surface of the main mirror wholly within the marginal limits of the reflecting surface of the main mirror and in close proximity and spaced parallelism, said means in each instance comprising brackets carried by the attachable reflecting surfaces of the prescribed corner portions of said auxiliary mirrors, each bracket having a bearing knuckle, a hinge pintle removably mounted in each bearing knuckle and a vacuum cup carried by each pintle, the vacuum cups being paired and detachably fastened on said reflecting surface, said pintles being at all times in close spaced parallelism relative to said reflecting surface.

CLEO SHAIKUN.

References Cited in the file of this patent

UNITED STATES PATENTS

| Number | Name | Date |
|---|---|---|
| 349,333 | Bay | Sept. 21, 1886 |
| 392,215 | Miller et al. | Nov. 6, 1888 |
| 760,478 | Obermiller | May 24, 1904 |
| 1,871,877 | Buckman | Aug. 16, 1932 |
| 2,044,520 | Weiant, Jr. | June 16, 1936 |
| 2,144,159 | Kieft | Jan. 17, 1939 |
| 2,197,280 | Topping | Apr. 16, 1940 |

FOREIGN PATENTS

| Number | Country | Date |
|---|---|---|
| 807,158 | France | Jan. 6, 1937 |
| 477,576 | Great Britain | Jan. 3, 1938 |